(12) United States Patent
Jane et al.

(10) Patent No.: US 10,817,581 B2
(45) Date of Patent: Oct. 27, 2020

(54) ATTACHING VISIBLE NETWORKS FOR SYNCHRONOUS LOCAL SEARCH RESULTS

(71) Applicant: Google LLC, Mountain View, CA (US)

(72) Inventors: Luis Barguno Jane, Zurich (CH); Quentin Fiard, Zurich (CH); Ankit Gupta, Zurich (CH)

(73) Assignee: Google LLC, Mountain View, CA (US)

( * ) Notice: Subject to any disclaimer, the term of this patent is extended or adjusted under 35 U.S.C. 154(b) by 17 days.

(21) Appl. No.: 16/177,518

(22) Filed: Nov. 1, 2018

(65) Prior Publication Data

US 2019/0075450 A1  Mar. 7, 2019

Related U.S. Application Data

(62) Division of application No. 15/455,529, filed on Mar. 10, 2017, now Pat. No. 10,154,406.

(51) Int. Cl.
*H04W 4/02* (2018.01)
*H04W 88/02* (2009.01)
(Continued)

(52) U.S. Cl.
CPC ........ *G06F 16/9537* (2019.01); *G01S 5/0018* (2013.01); *H04W 4/025* (2013.01);
(Continued)

(58) Field of Classification Search
None
See application file for complete search history.

(56) References Cited

U.S. PATENT DOCUMENTS

| 7,254,388 | B2 | 8/2007 | Nam et al. |
| 7,702,610 | B2 * | 4/2010 | Zane ...................... G16H 50/70 707/999.001 |

(Continued)

OTHER PUBLICATIONS

"Changing Location Settings." Android Developers. Develop > Training > Building Apps with Location & Maps > Making Your App Location-Aware. © 1995-2015. Retrieved from the Internet: <https://developer.android.com/training/location/change-location-settings.html>. 5 pages.
(Continued)

*Primary Examiner* — Ajit Patel
(74) *Attorney, Agent, or Firm* — Lerner, David, Littenberg, Krumholz & Mentlik, LLP

(57) ABSTRACT

Aspects of the technology employ an integrated location identification and query processing technique. Network scan information is attached to or otherwise combined with a query at a client device and is sent to a web server or other entity for processing. When a query is initiated, the client device determines whether location services are enabled. If not, upon authorization they are enabled and visible network scan data is quickly obtained for transmission with the query. The server may include both a location identification service and a search service, and can split the received information accordingly among these elements in an efficient manner that minimizes data transfers and latency. From the client device's perspective, only one query is transmitted. Relevant results based on the resolved location are received quickly by the client device. This reduces system latency and power consumption, and also minimizes network overhead by eliminating unnecessary packet transmissions.

20 Claims, 6 Drawing Sheets

(51) Int. Cl.
  *G06F 16/9537* (2019.01)
  *H04W 8/24* (2009.01)
  *H04W 76/15* (2018.01)
  *G01S 5/00* (2006.01)
  *H04W 12/08* (2009.01)

(52) U.S. Cl.
  CPC ......... *H04W 8/24* (2013.01); *H04W 12/0804* (2019.01); *H04W 76/15* (2018.02); *H04W 88/02* (2013.01); *Y02D 10/45* (2018.01)

(56) References Cited

U.S. PATENT DOCUMENTS

| | | | |
|---|---|---|---|
| 7,848,765 | B2 | 12/2010 | Phillips et al. |
| 8,260,769 | B1* | 9/2012 | Fuller ................ G06F 16/2228 707/721 |
| 8,369,266 | B2 | 2/2013 | Jin et al. |
| 8,750,265 | B2 | 6/2014 | Scherzer et al. |
| 8,804,680 | B2 | 8/2014 | Schmidt et al. |
| 8,898,095 | B2* | 11/2014 | Agrawal ................ G06N 20/00 706/12 |
| 8,914,235 | B1 | 12/2014 | Wichrowska et al. |
| 2004/0093325 | A1 | 5/2004 | Banerjee et al. |
| 2004/0198386 | A1 | 10/2004 | Dupray |
| 2007/0061317 | A1 | 3/2007 | Ramer et al. |
| 2007/0078851 | A1* | 4/2007 | Grell ................ G06F 16/9535 |
| 2007/0174299 | A1 | 7/2007 | Kuang et al. |
| 2008/0005071 | A1* | 1/2008 | Flake ................ G06Q 30/0261 |
| 2008/0009268 | A1* | 1/2008 | Ramer ................ H04L 67/2847 455/412.1 |
| 2008/0168033 | A1* | 7/2008 | Ott ................ G06F 16/9537 |
| 2009/0132645 | A1* | 5/2009 | Yang ................ G06F 16/9537 709/203 |
| 2010/0325127 | A1 | 12/2010 | Chaudhuri et al. |
| 2011/0137895 | A1 | 6/2011 | Petrou et al. |
| 2012/0157121 | A1 | 6/2012 | Li et al. |
| 2012/0158712 | A1* | 6/2012 | Karanjkar ......... G06F 16/24578 707/724 |
| 2012/0190380 | A1 | 7/2012 | Dupray et al. |
| 2013/0165143 | A1 | 6/2013 | Ziskind et al. |
| 2013/0232006 | A1* | 9/2013 | Holcomb ............. G06F 16/951 705/14.54 |
| 2013/0246381 | A1* | 9/2013 | Garg ................... G06F 16/9537 707/706 |
| 2013/0331118 | A1 | 12/2013 | Chhabra et al. |
| 2016/0188602 | A1* | 6/2016 | Glover ................... H04L 67/18 707/749 |
| 2016/0277315 | A1* | 9/2016 | Miller ..................... H04L 67/18 |
| 2017/0034215 | A1 | 2/2017 | Sigel et al. |
| 2017/0245113 | A1 | 8/2017 | Hooker |
| 2017/0359344 | A1 | 12/2017 | Kaal et al. |
| 2018/0152827 | A1 | 5/2018 | Perez et al. |

OTHER PUBLICATIONS

"Location Strategies." Android Developers. Develop > API Guides > Location and Sensors. © 1995-2015. Retrieved from the Internet: <https://developer.android.com/guide/topics/location/strategies.html>. 11 pages.

Shaw, Blake et al., Learning to Rank for Spatiotemporal Search, WSDM, 2013, Feb. 4-8, 2012, Rome, Italy, 10 pages.

Lymberopoulos, Dimitrios et al., Location-aware Click Prediction in Mobile Local Search, CIKM 2011, Oct. 24-28, 2011, Glasgow, Scotland, UK, 10 pages.

Invitation to Pay Additional Fees; Communication Relating to the Results of the Partial International Search; Provisional Opinion Accompanying the Partial Search Result for International Application No. PCT/US2017/057970 dated Jan. 25, 2018. 15 pages.

International Search Report and Written Opinion for International Application No. PCT/US2017/057970 dated Apr. 25, 2018. 21 pages.

International Preliminary Report on Patentability for International Application No. PCT/US2017/057970 dated Sep. 19, 2019. 13 pages.

Office Action for Korean Patent Application No. 10-2019-7026512 dated Jun. 8, 2020. 6 pages.

* cited by examiner

ATTACHING VISIBLE NETWORKS FOR SYNCHRONOUS LOCAL SEARCH RESULTS

CROSS REFERENCE TO RELATED APPLICATIONS

The present application is a divisional of U.S. patent application Ser. No. 15/455,529, filed Mar. 10, 2017, the entire disclosure of which is incorporated herein by reference.

BACKGROUND

In order to provide meaningful search results and other information to a user of a mobile wireless device, the location—or at least an approximate location—of that device needs to be identified. One can baseline the location estimate using GPS coordinates, but this may be problematic when there are not enough visible GPS satellites or the device is indoors. In addition, this approach may have a high latency while a GPS receiver acquires satellite signals, and may also suffer from a power drain due to high battery usage. Information about cellular networks and wireless access points may also be employed to obtain the location estimate. Here, resolving the location of a device may include accessing network-side databases that store geolocalized wireless network information including cellular tower and WiFi access point information. Such databases can be used to geocode scans of visible networks.

However, existing approaches may require multiple requests and responses between the mobile device and the network. For instance, a first request may involve resolving a location from a network scan, and a second request may be done to perform the actual search or other query using the resolved location from the first request. This can cause an unnecessary delay and consumption of network (and client device) resources. And for queries that are time sensitive, forgoing a location estimate can provide responses not relevant to the user's actual location.

BRIEF SUMMARY

Aspects of the technology involve a single, integrated request and response approach between the mobile device and the network. This can be especially beneficial when the request is sent shortly after the mobile device has been turned on, or when a user first grants location permissions on the device to an application such as a search application. By way of example, two use scenarios are as follows. One is when a location cached in the device is too old to be relied upon (stale) or is not available. The other is when the user activates or otherwise authorizes location-enabled settings for an app on the client device, but the client device does not have time to acquire a location before a search or other query is initiated by the app.

In accordance with aspects of the technology, a method includes determining, by one or more processors of a client device, whether a threshold condition corresponding to current location information for the client device has been met, and upon determining that the threshold condition corresponding to the current location information for the client device has been met, obtaining by the processors visible network data from a wireless communication module of the client device. The method also includes generating an integrated request packet including at least some of the obtained visible network data and a client query, transmitting the integrated request packet to a server, receiving a location-enabled response to the client query in accordance with resolution of a location for the at least some of the obtained visible network data, and generating, for presentation to a user of the client device, a result including the received location-enabled response.

In one scenario, the threshold condition is a change of a location permission of an application executable by the client device. Here, the change of the location permission may include an authorization to use information associated with at least one of a WiFi network and a cellular network for location services.

According to one example, the threshold condition is a determination that there has been a network connectivity change. In another example, the method further comprises, prior to determining that the threshold condition corresponding to the current location information for the client device has been met, precomputing at least one of WiFi access point and cellular base station information for connected networks. In a further example, the visible network data includes at least one of an access point ID, a base station ID, and received signal strength information.

In another alternative, obtaining the visible network data from the wireless communication module of the client device includes selecting a subset of visible network elements from among all visible network elements, and obtaining the visible network data from the wireless communication module for the subset of visible network elements. According to another example, determining whether the threshold condition corresponding to current location information for the client device has been met includes determining whether location information stored on the client device is older than a predetermined amount of time. And in yet another example, generating the result includes providing an electronic map for presentation on a display of the client device.

According to other aspects of the technology, a client device is provided, which includes a user interface module including one or more user input devices configured to receiver a user query, a processing module including one or more processors, a memory module having one or more memories configured to store data and instructions for execution by the processing module, and a communication module including a wireless transceiver configured for bidirectional communication with one or more remote devices. The processing module is operatively coupled to the communication module and is configured to determine whether a threshold condition corresponding to current location information for the client device has been met. Upon determining that the threshold condition corresponding to the current location information for the client device has been met, the processing module is configured to obtain visible network data from the wireless transceiver, generate an integrated request packet including at least some of the obtained visible network data and a client query, and cause the communication module to transmit the integrated request packet to a remote server. The device is also configured to receive a location-enabled response to the client query in accordance with resolution of a location for the at least some of the obtained visible network data, and generate for presentation to a user of the client device, a result including the received location-enabled response.

In one example, the threshold condition is a change of a location permission of an application executable by the client device. In another example, the change of the location permission includes an authorization to use information associated with at least one of a WiFi network and a cellular network for location services. According to yet another example, the processing module is further configured, prior to determining that the threshold condition corresponding to the current location information for the client device has been met, to precompute at least one of WiFi access point and cellular base station information for connected networks. And in a further example, the processing module is configured to determine whether the threshold condition corresponding to current location information for the client device has been met by determining whether location information stored on the client device is older than a predetermined amount of time.

According to other aspects of the technology, a method is provided that includes receiving, by one or more processing devices, an integrated request from a client device, the integrated request including location scan information and a query, parsing the received location scan information from the integrated request, and resolving a location of the client device by comparing the location scan information against a set of stored geolocation data. The method also includes applying the resolved location to the query to obtain a set of location relevant search results responsive to the query, and transmitting the location relevant search results to the client device for presentation to a user of the client device.

In one scenario, the method further comprises providing the parsed location scan information to a location service to resolve the location of the client device. Here, the method may also include the location service providing the resolved location to an application service to obtain a set of location relevant search results responsive to the query.

In another example, parsing the received location scan information from the integrated request includes concurrently passing the location scan information to a location service and the query to an application service. This may also include the application service initiating a first search stage using only the query to identify a set of possible search results. And, alternatively, applying the resolved location to the query may include using the resolved location in a second stage refinement search to obtain the set of location relevant search results.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

The following description is based on embodiments of the claims and should not be taken as limiting the claims with regard to alternative embodiments that are not explicitly described herein.

DETAILED DESCRIPTION

Overview

The integrated approach discussed herein includes attaching network scan information to a query that is sent to a web server or other entity. In one instance, the server provides both a location identification service and a search service, and can split the received information accordingly among these elements of the server in an efficient manner that minimizes data transfers and latency. However, from the client device's perspective, only one query is transmitted. Relevant results based on the location are received quickly by the client device. Not only does this reduce system latency and power consumption, but it also minimizes network overhead by eliminating unnecessary packet transmissions.

Figure 1A:
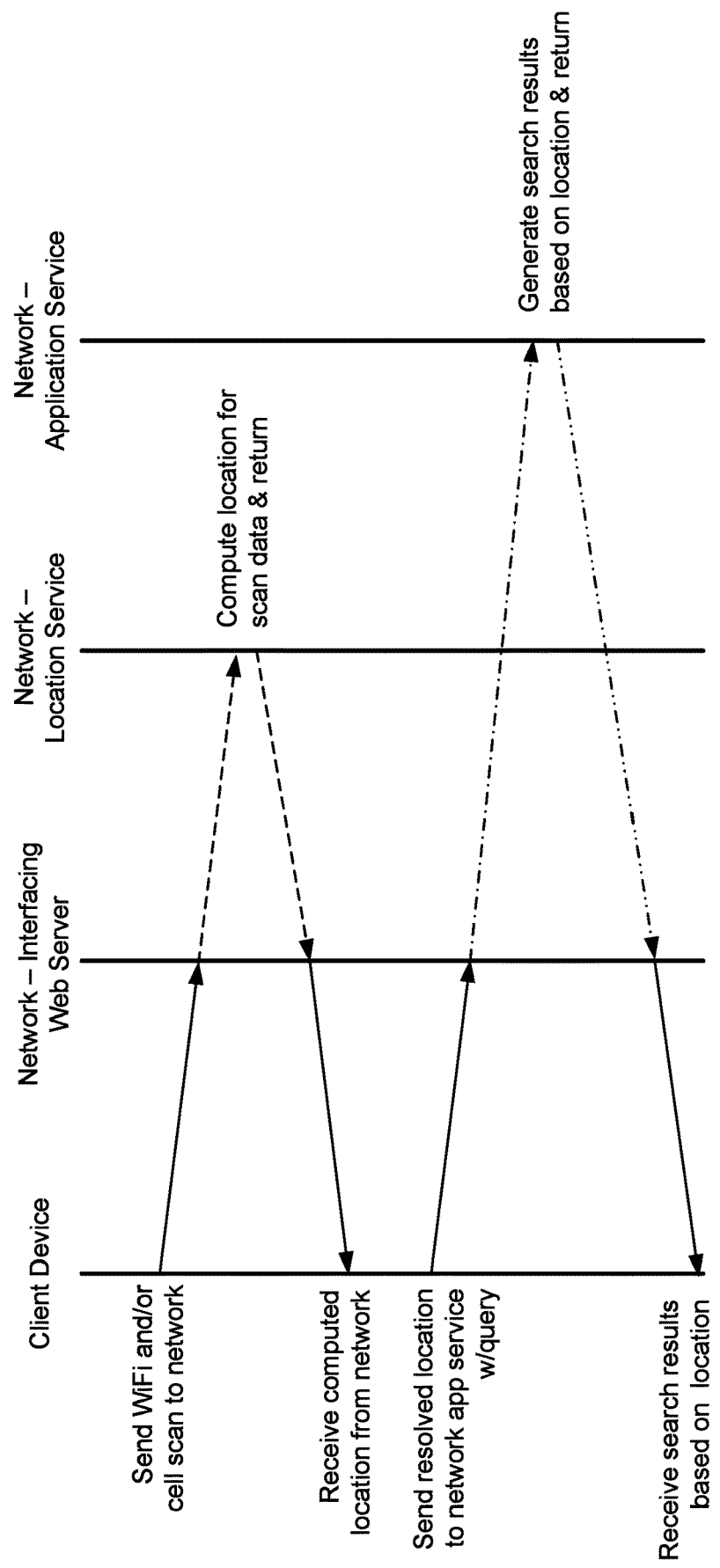
FIG. 1A illustrates a location request and query process.

This approach is in contrast to a conventional query process illustrated in FIG. 1A. Here, location information is sent from a client device to the network, where it is routed from an interfacing web server to a location service. The location service computes the location and returns the result to the client device via the interfacing web server. Based on this information, the client device is able to send a resolved location to a network application service along with a query. This information again passes through the interfacing web server before being received at the application service, which generates search results based on the resolved location. The results are then provided back to the client device via the web server.

Latency may be an issue with this approach for different reasons. As noted above, there may be latency on the client side while an on-board GPS receiver acquires satellite signals. And there may also be latency with transmissions between the client device and the network, as well as possible back end delays between different elements of the network.

Figure 1B:
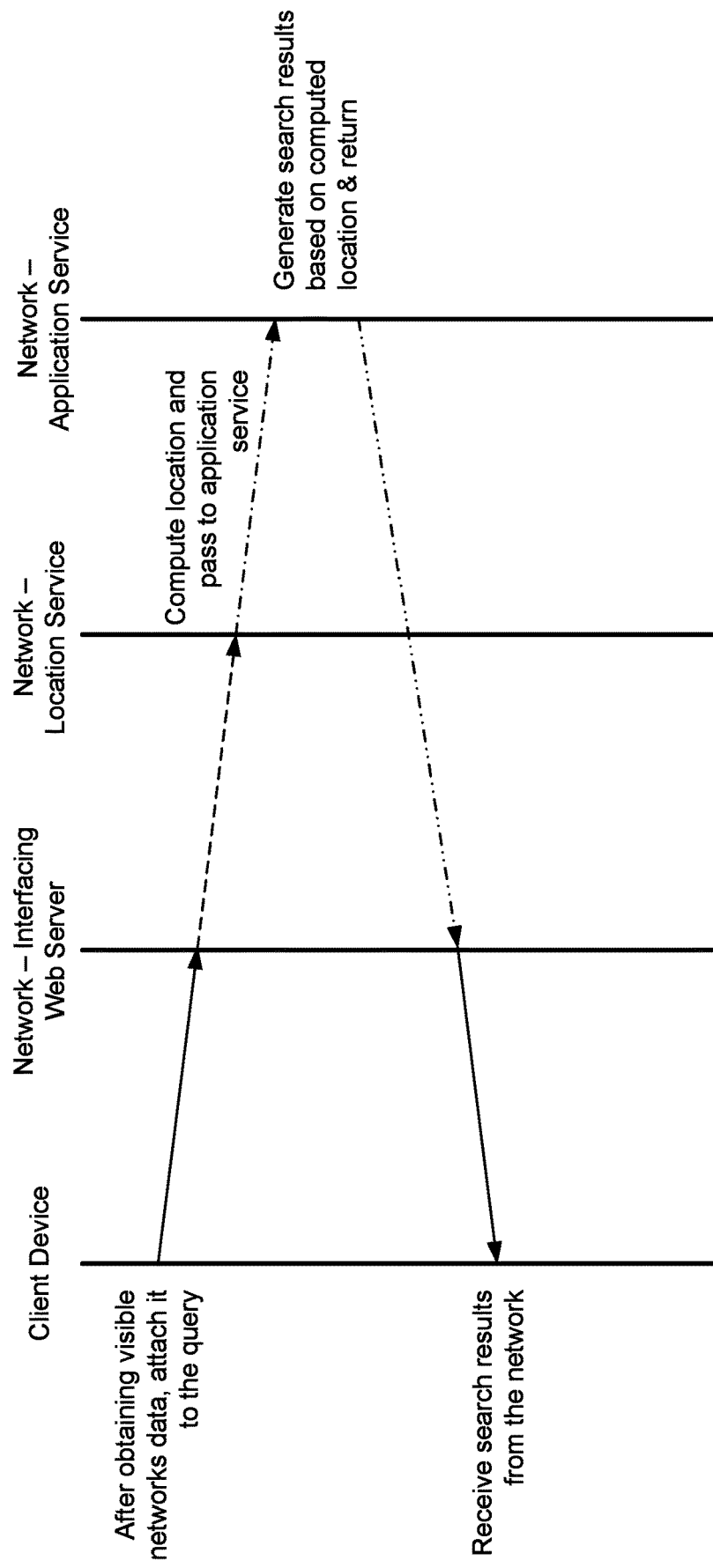
FIG. 1B illustrates an example integrated request and response process according to aspects of the disclosure.

An example of the integrated approach is illustrated in FIG. 1B. Here, as discussed in more detail below, obtained visible network data is attached to a query, which is then transmitted to the network. An interfacing web server provides the visible network data to the network's location service to resolve the location. That information is passed to the relevant application service, which generates location-relevant search results. This information is returned to the client device via the interfacing web server. The consolidation of information up front reduces the aforementioned delays, and helps ensure that response to the query is based on an accurate location.

Example Arrangement

Figure 2:
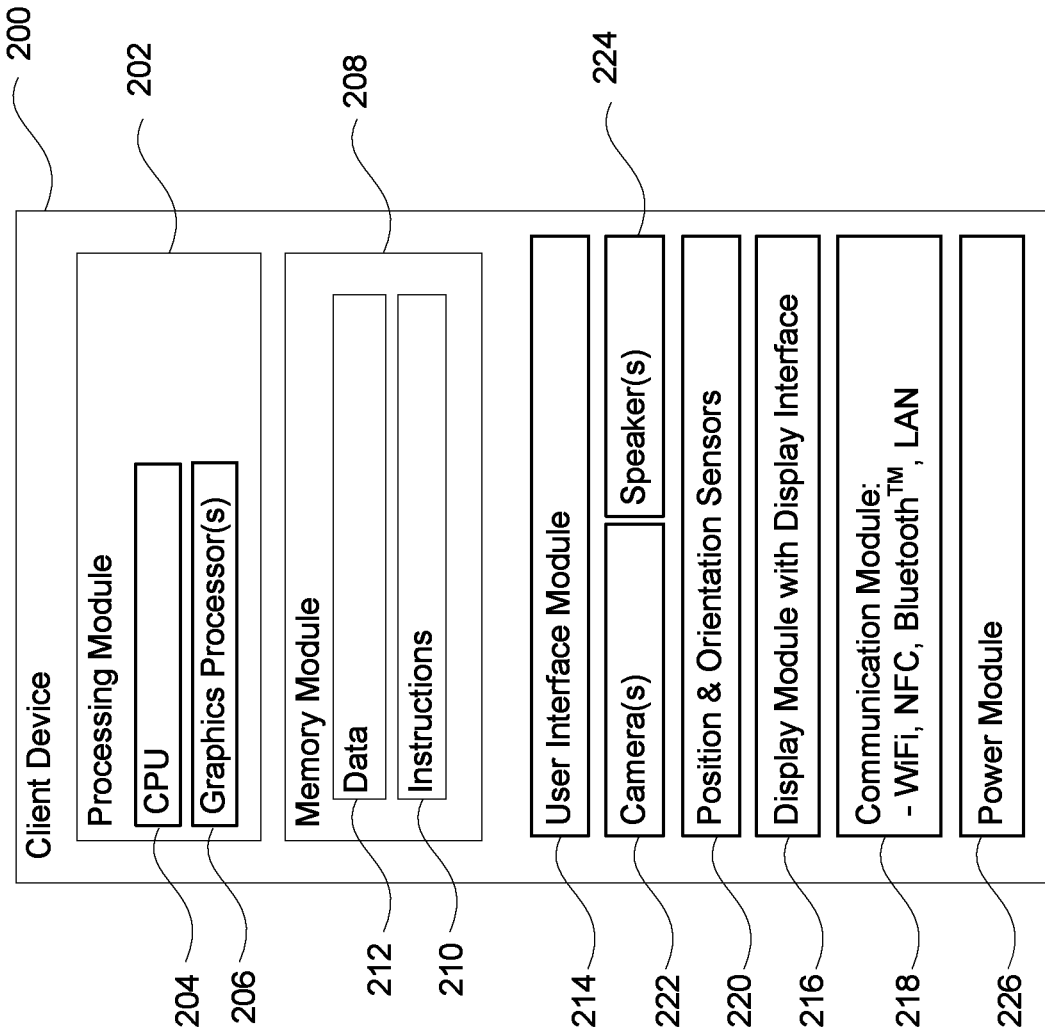
FIG. 2 is an example client communication device configured to implement the integrated request and response process in accordance with aspects of the disclosure.

FIG. 2 illustrates an example client device 200 that may be employed with the techniques disclosed herein. As shown, the device 200 includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 having a display interface.

User interface module 214 may receive commands from a user via user inputs and convert them for submission to a given processor. The user inputs may include one or more of a touch screen, keypad, mouse, stylus, microphone, or other types of input devices. The display module 216 may comprise appropriate circuitry for driving the display device to present graphical and other information to the user. By way of example, the graphical information may be generated by the graphics processor(s) 206, while CPU 204 manages overall operation of the client device 200.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include DVD, CD-ROM, write-capable, and read-only memories. In one implementation, a computer program product is tangibly embodied in an information carrier. The computer program product contains instructions, such as instructions 210 that, when executed by one or more processors, perform one or more methods such as those described herein. The information carrier is a computer- or machine-readable medium, such as memory module 208. Although FIG. 2 functionally illustrates the processor(s), memory module, and other elements of device 200 as being within the same overall block, such components may or may not be stored within the same physical housing. For example, some or all of the instructions and data may be stored on an information carrier that is a removable storage medium (e.g., optical drive or USB drive) and others stored within a read-only computer chip.

The data 212 may be retrieved, stored or modified by the processors in accordance with the instructions 210. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

As also shown in FIG. 2, the client device 200 includes a communication module 218 for communicating with other devices and systems. The communication module 218 includes a wireless transceiver; alternatively, the module may include a wired transceiver. The client device 200 may communicate with other remote devices via the communication module 218 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the client device 200 as shown includes one or more position and orientation sensors 220. The position and orientation sensors 220 are configured to determine the position and orientation of client computing device 100. For example, these components may include a GPS receiver to determine the device's latitude, longitude and/or altitude as well as an accelerometer, gyroscope or another direction/speed detection device. The client device 200 may also include one or more camera(s) 222 for capturing still images and recording video streams, speaker(s) 224 and a power module 226, as well as actuators (not shown) to provide tactile feedback or other information to the user.

Figure 3:
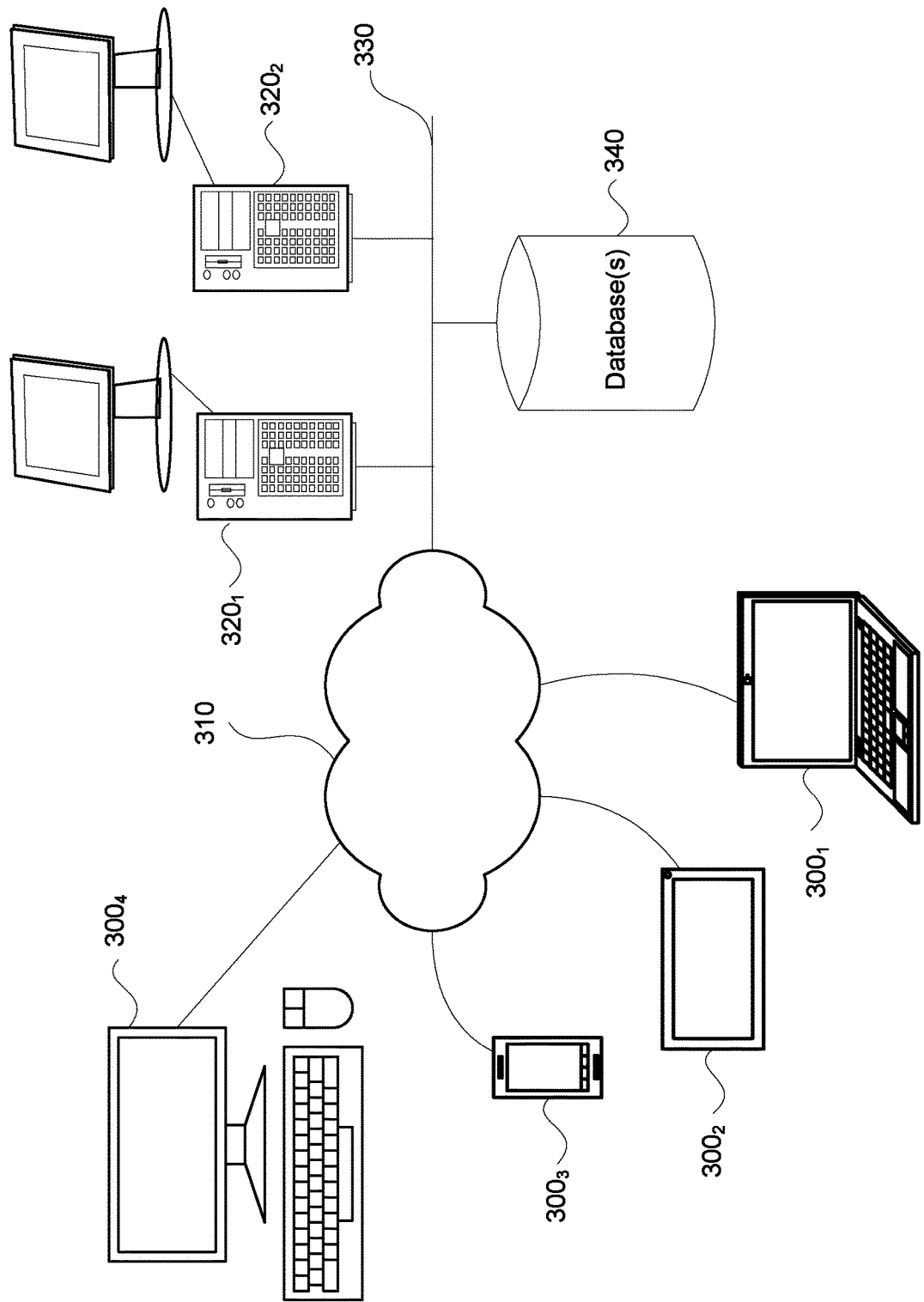
FIG. 3 illustrates an example network in accordance with aspects of the disclosure.

FIG. 3 illustrates an example arrangement in which different client devices 300, e.g., $300_1$, $300_2$, $300_3$ and $300_4$ may request content or other information from servers 320 via communication system 310. The client devices 300 may include some or all of the components discussed above with regard to client device 200. The client devices may include laptops ($300_1$), tablets ($300_2$), cellular phones or PDAs ($300_3$) or desktop PCs ($300_4$). However, other client devices, including wearable electronics such as smart watches, may also be employed. Any such client device may send requests as shown in FIG. 1B and receive targeted results from the network based on a resolved location of the client device.

By way of example only, the requests may be parsed and routed to one or more services on the network. This may include a location service associated with server $320_1$ and an application service associated with server $320_2$. While multiple discrete servers 320 are shown the functionality of the location and application services may be performed by one or more servers or other computer systems, such as a cloud computing network. The requests, data and corresponding responses may be passed via bus 330. One or more databases 340 may be used by the services to resolve the client device location and/or to provide relevant results in accordance with the resolved location information.

Example Methods and use Cases

As noted above, features of the technology can be implemented in different use cases. Examples of several use cases are discussed below.

In one use case, the user may request information via an app on the client device. By way of example, the information could be about a point of interest such as a restaurant, coffee shop, car dealership, museum, etc. Other use cases may involve on-line shopping or other order placement. Nonetheless, the technology is query-agnostic. For example, the user may request information about bus time tables, house rentals, tourist points of interest, menus, etc. The technology is equally applicable to emergency services that depend on accurate locations.

Figure 4:
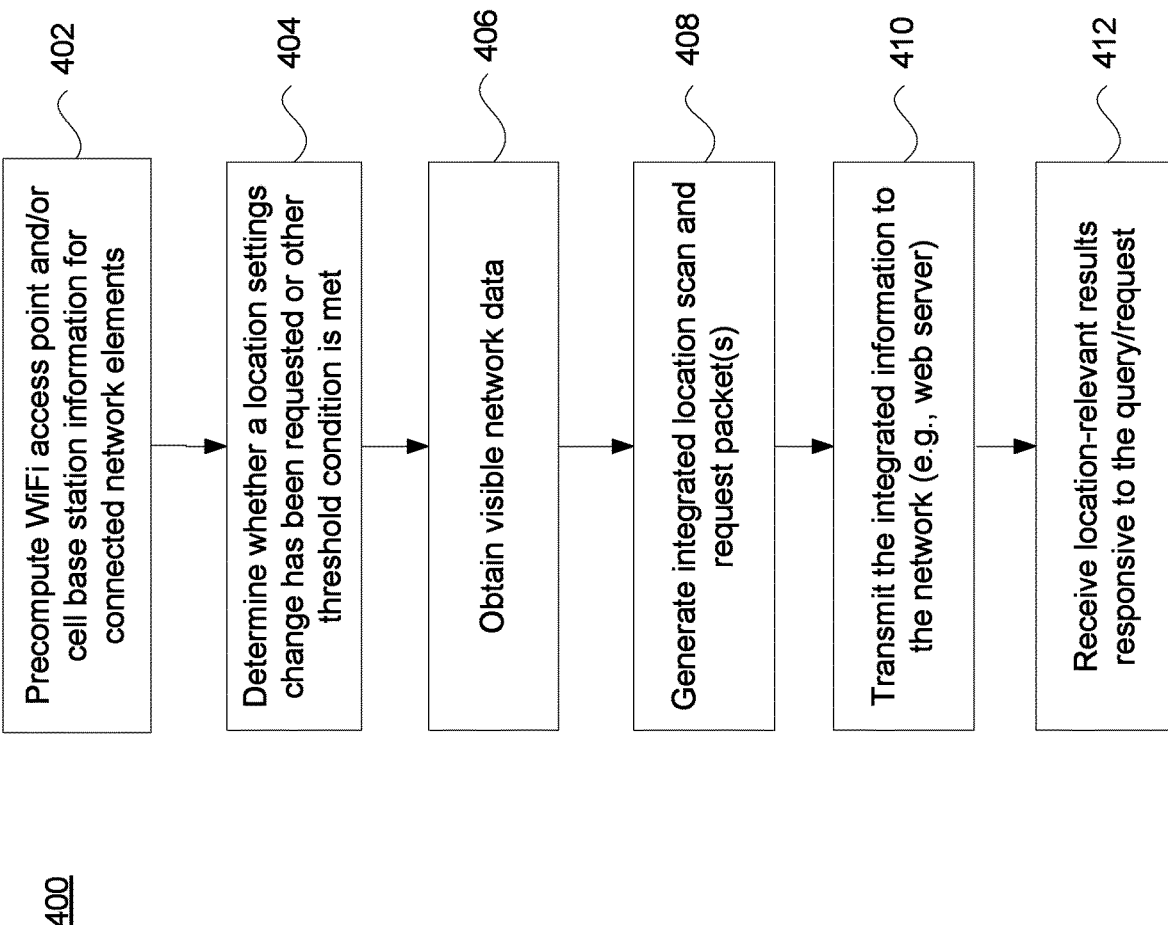
FIG. 4 illustrates a process incorporating visible network information with a query in accordance with aspects of the disclosure.

One example scenario is shown in relation to flow diagram 400 of FIG. 4. Here, in block 402 the process precomputes network information. For instance, the communication module 218 (FIG. 2) may continuously or intermittently scan wireless networks. WiFi access point and/or cellular base station information may be gathered for remote devices the client device is connected to via a communication link, or other devices that are "visible" to the client device as it scans available frequencies and communication bands. Such operation occurs automatically at the client device without user interaction. However, to conserve battery life, the scans may be intermittent, for a limited number of remote devices, and/or include other constraints that limit the viability of the obtained network information.

Once the user has initiated a query, for instance by typing, tapping or speaking a request via the user interface module 214 of FIG. 2, the system may determine whether any location information is available for the client device. For instance, in block 404 the system determines whether a location settings change has been requested or some other threshold condition is met. Here, a location settings change may occur by the app requesting enablement of location services. Or the system may determine that the obtained network information is not viable due to it being stale, e.g., too old to provide a useful location within a certain accuracy. For example, if the precomputed network information is more than 1 minute old, it may be considered stale. This time may alternatively be 30 seconds, 10 minutes, or longer or shorter.

In some scenarios the default is that location services on the client device are not enabled without express authorization by the user. Here, the app may prompt the user to grant location permissions to the app. This can involve turning on one or more specific location services including cellular and WiFi networks. In some situations, the user may be asked to indicate which specific location services are to be activated. In other situations, the user may authorize all applicable location services are to be activated in order to obtain location-relevant query results.

At the point where location permissions have been granted and the location service(s) has been initiated, the client device may not yet have acquired highly accurate location signals. For example, there may be no device location, or an imprecise set of IP geolocation or historical location signals. In this situation, once the user grants the location permissions, the system may immediately trigger a (re)load of the location information. This occurs in block 406, where the system, for instance using the communication module 218, obtains visible network data.

Some of this data might be available even before the settings change, and in that case it would be precomputed. But unfortunately, it can take time to acquire useful location information after permissions are granted. By way of example, it may take at anywhere from 5-500 ms or longer to update cellular and/or WiFi network data with current information.

The visible network data may include some or all of the following. For WiFi networks, BSSID, SSID and signal strength of access points can be gathered. And for cell networks (e.g., CDMA, GSM, LTE, WCDMA), the information may comprise cell ID, Location Area Code, Mobile Country Code, Mobile Network Code and Primary Scrambling Code. Other types of data, such as information about ad-hoc or near field connections, as well as other types of wireless scan information, may also be gathered.

At the client device, it is beneficial to track visible networks in a passive way to minimize the impact on battery drain. Even without the device location enabled, the system will have some information regarding actively connected networks. Updating information on such connected networks may be much quicker than obtaining information on all visible access points and cell base stations. In one example, computing visible networks will not trigger a WiFi scan; instead, the system may read the latest WiFi scan information available from the device.

Also, while it is possible to resolve the location at the client device, this may be computationally intensive and time consuming. It may also increase batter drain. Thus, the approach discussed herein takes the burden off of the client device and allows the network to resolve the location in an efficient manner.

Due to latency and/or power constraints on the client device side, it may not be possible to attach a full scan of WiFi and cell data. In one example, only data for actively connected WiFi access points and/or cell base stations may be provided. In another example, data for a subset of visible but not connected WiFi access points and/or cell base stations may be provided, either alone or with the data for actively connected devices. The subset of visible devices may be on the order of 2-5 devices. Alternatively, the system may attempt to gather scan data for any devices within communication range.

To avoid returning results based on a stale or otherwise outdated location, when the location permissions are granted the system is configured to generate an integrated location scan and request (query) that is sent to the network. The location scan desirably includes both WiFi and cell scan information, but as indicated above various types of network information may be included. The integrated location scan and request data packet(s) is generated at block 408. By way of example only, a processor such as the CPU 204 may incorporate the network location scan information with a search or other query received via the user interface module 214 to create the integrated request. This integrated request is transmitted to the network at block 410. Then in response one or more location-relevant results responsive to the query are received from the network at block 412.

Figure 5:
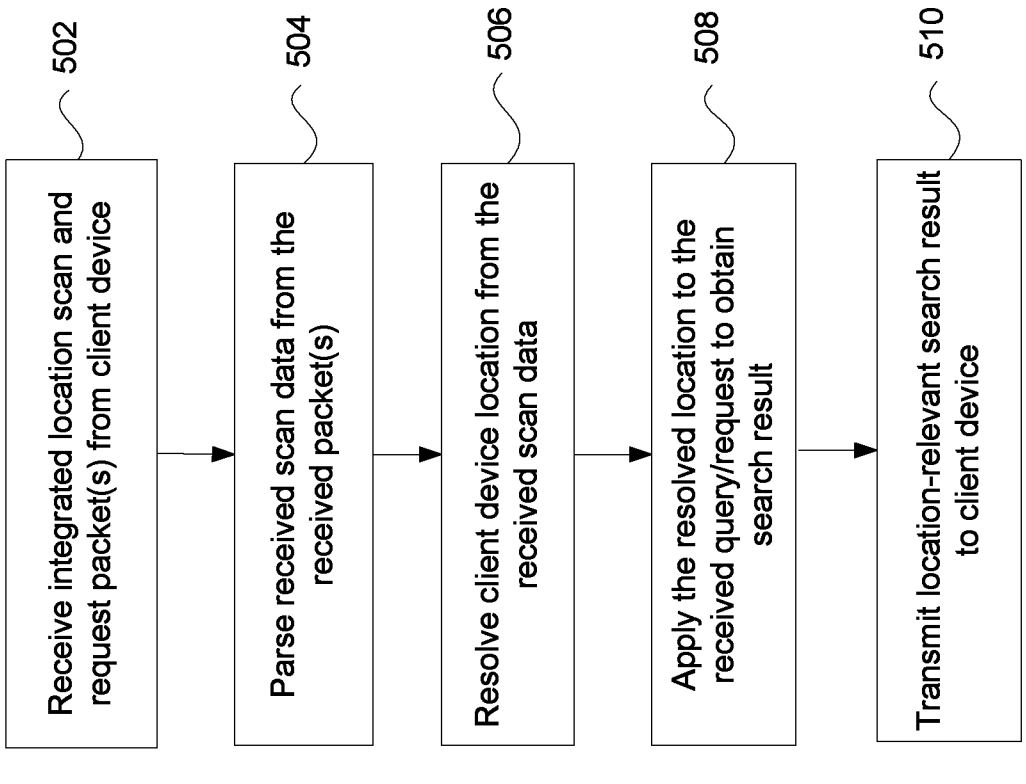
FIG. 5 illustrates a process for resolving a location and responding to a query in accordance with aspects of the disclosure.

FIG. 5 illustrates an example process 500, in which the network receives and processes the integrated request. As shown in block 502, the integrated location scan and request packet(s) is received from the client device. According to aspects of the disclosure, the scan data received by the network will not be logged. On the network side, the server such as an interfacing web server or equivalent receives the integrated information. The server identifies that the received packet(s) includes both a query and scan data, parsing out the scan data at block 504 and sending it to a location service to resolve a location. For instance, the scan data may be provided to a location service of server $320_1$ of FIG. 3. The location service may resolve the client device location at block 506 by accessing a geolocation database such as database 340. This may involve matching the WiFi and/or cellular signal information to corresponding information in the geolocation database. In one implementation, the resolved location information will be added to the location context of the request in the server and logged as a regular device location.

Upon resolution, the network employs the resolved location when answering the request. Here, at block 508 the resolved location is applied to received query or other request to obtain the search result. By way of example, an application service associated with server $320_2$ of FIG. 3 may use the resolved location to identify a subset of possible search results, or to otherwise rank the results in relation to the location. Once the location-relevant results have been obtained, they are returned to the client device at block 510.

Returning to step 504, once the system determines that the received request is an integrated request, the interfacing web server may first pass the scan data to the location service and wait for results, and then pass that information along to the application service. Alternatively, the interfacing web server may concurrently pass the scan data to the location service and the query to the application service. This further minimizes latencies due to intra-network communication. Here, the application service may begin a first stage of the search to obtain a first set of results. And when it receives the resolved location, it may conduct a second stage refinement search using the location information to produce the final results. These results are then returned to the client device.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method comprising:
receiving, by one or more processing devices, an integrated request from a client device, the integrated request including network location scan information and a query;
parsing the received network location scan information from the integrated request;
resolving, by one or more processing devices, a location of the client device by comparing the network location scan information against a set of stored geolocation data;
applying, by one or more processing devices, the resolved location to the query to obtain a set of search results responsive to the query based on the location of the client device; and
transmitting the set of search results to the client device for presentation to a user of the client device.

2. The method of claim 1, further comprising providing the parsed location scan information to a location service to resolve the location of the client device, wherein the network location scan information includes at least one of WiFi or cell scan information.

3. The method of claim 2, further comprising the location service providing the resolved location to an application service to obtain a set of search results responsive to the query based on the location of the client device.

4. The method of claim 2, wherein the location service performs resolving of the location of the client device by matching selected signal information of the network location scan information to corresponding information in a geolocation database maintaining the set of stored geolocation data.

5. The method of claim 1, wherein parsing the received network location scan information from the integrated request includes concurrently passing the network location scan information to a location service and the query to an application service.

6. The method of claim 5, wherein the method further includes the application service initiating a first search stage using only the query to identify a set of possible search results.

7. The method of claim 6, wherein applying the resolved location to the query includes using the resolved location in a second stage refinement search to obtain the set of search results based on the location of the client device.

8. The method of claim 1, wherein parsing the received location scan information from the integrated request includes:
passing, by an interfacing web server, the network location scan information to a location service;
receiving, by the interfacing web server, the resolved location from the location service; and
then passing, by the interfacing web server, the resolved location to an application service to obtain the set of search results responsive to the query based on the location of the client device.

9. A server system, comprising:
a location database configured to store a set of geolocation data; and
one or more processors operatively coupled to the location database, the one or more processors being configured to:
receive an integrated request from a client device, the integrated request including network location scan information and a query;
parse the received network location scan information from the integrated request;
resolve a location of the client device by comparing the network location scan information against the set of stored geolocation data;
apply the resolved location to the query to obtain a set of search results responsive to the query based on the location of the client device; and
transmit the set of search results to the client device for presentation to a user of the client device.

10. The server system of claim 9, wherein the one or more processors are further configured to provide the parsed network location scan information to a location service to resolve the location of the client device, wherein the network location scan information includes at least one of WiFi or cell scan information.

11. The server system of claim 10, further comprising the location service, wherein the location service is configured to provide the resolved location to an application service to obtain a set of search results responsive to the query based on the location of the client device.

12. The server system of claim 11, further comprising the application service.

13. The server system of claim 11, wherein the location service is configured to resolve the location of the client device by matching selected signal information of the network location scan information to corresponding information in the location database maintaining the set of stored geolocation data.

14. The server system of claim 9, wherein the one or more processors are configured to parse the received network location scan information from the integrated request by concurrently passing the network location scan information to a location service and the query to an application service.

15. The server system of claim 14, further comprising the application service, wherein the application service is configured to initiate a first search stage using only the query to identify a set of possible search results.

16. The server system of claim 15, wherein the application service is configured to apply the resolved location to the query by using the resolved location in a second stage refinement search to obtain the set of search results based on the location of the client device.

17. The server system of claim 9, wherein the one or more processors include an interfacing web server, the interfacing web server being configured to parse the received location scan information from the integrated request by:
passing the network location scan information to a location service;
receiving the resolved location from the location service; and
then passing the resolved location to an application service to obtain the set of search results responsive to the query based on the location of the client device.

18. The server system of claim 17, further comprising the location service and the application service.

19. A non-transitory computer-readable recording medium having instructions stored thereon, the instructions, when executed by one or more processors, causing the one or more processors to perform a method comprising:
- receiving an integrated request from a client device, the integrated request including network location scan information and a query;
- parsing the received network location scan information from the integrated request;
- resolving a location of the client device by comparing the network location scan information against a set of stored geolocation data;
- applying the resolved location to the query to obtain a set of search results responsive to the query based on the location of the client device; and
- transmitting the set of search results to the client device for presentation to a user of the client device.

20. The non-transitory computer-readable recording medium of claim 19, wherein parsing the received network location scan information from the integrated request includes concurrently passing the network location scan information to a location service and the query to an application service, wherein the network location scan information includes at least one of WiFi or cell scan information.

* * * * *